No. 608,398. Patented Aug. 2, 1898.
W. S. G. BAKER.
ADJUSTABLE COLLAR FOR SHAFTS.
(Application filed May 6, 1898.)
(No Model.)
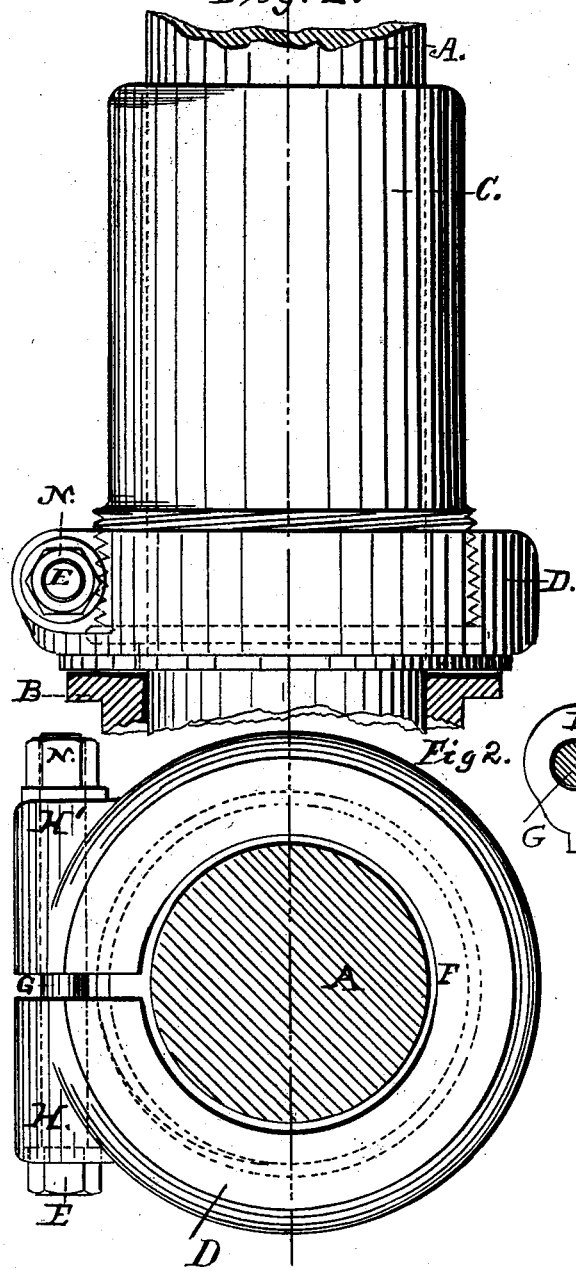
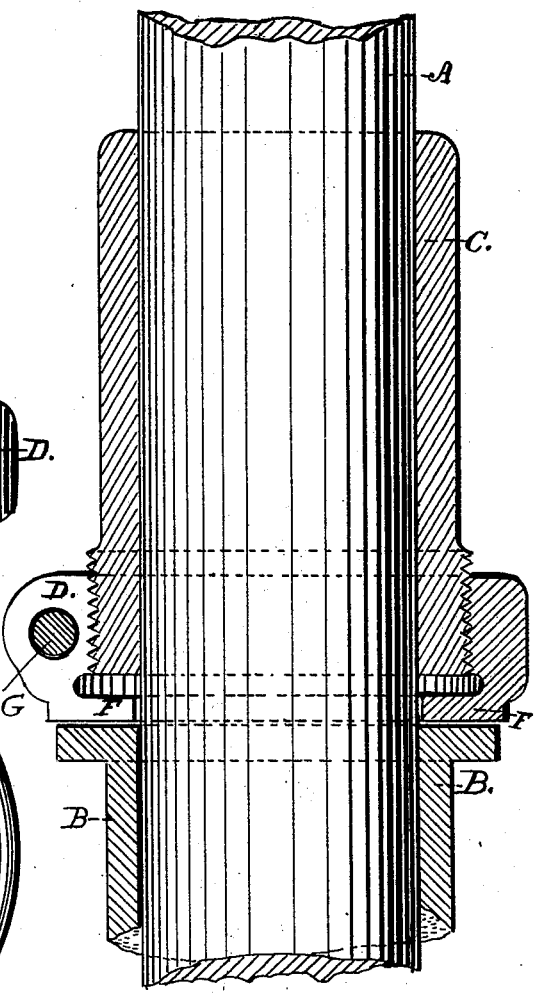
Witnesses
Dan'l W Powell
JSG Baker
Inventor
William Sebastian Graff Baker

UNITED STATES PATENT OFFICE.

WILLIAM SEBASTIAN GRAFF BAKER, OF BALTIMORE, MARYLAND.

ADJUSTABLE COLLAR FOR SHAFTS.

SPECIFICATION forming part of Letters Patent No. 608,398, dated August 2, 1898.

Application filed May 6, 1898. Serial No. 679,877. (No model.)

*To all whom it may concern:*

Be it known that I, WILLIAM SEBASTIAN GRAFF BAKER, a citizen of the United States, residing in the city of Baltimore, State of Maryland, have invented certain new and useful Improvements in Adjustable Collars for Shafts or Axles, of which the following is a specification.

My invention relates to improvements in that class of collars used upon axles of electric-motor trucks so placed as to receive the end thrust of the bearings at end of electric motors where they rest upon the axles. In this class of collars the part of motor-bearings that support end of motor upon the truck-axle and bear against the collar on the axle is subject to excessive wear, and if such wear is not provided for the end or lateral play becomes so great as to be very objectionable. By my invention I seek to overcome this objectionable feature and to keep this end play normal. I attach a collar rigidly to the axle or shaft by any of the usual mechanical methods. This collar is formed with a threaded end, upon which a loose threaded collar is screwed. This loose collar is split at one side on a radial line and can be adjusted at will, and when properly placed held in position by bolt and nut, drawing the split ends together and clamping the loose collar rigidly upon the fixed collar.

In the accompanying drawings, Figure 1 is the elevation of the axle of a motor-truck with my improved adjustable collar applied; Fig. 2, an end elevation of the same, and Fig. 3 a transverse section of the adjustable collar on the axle.

Referring to the drawings, which show the particular construction of adjustable collar, A indicates the axle of an electric truck; C, collar fixed upon axle, preferably by hydraulic pressure; D, loose collar threaded on inside to screw on that portion of fixed collar C which is threaded to receive it.

B indicates the end of motor-bearing in which axle A revolves.

F is flange of loose collar D.

The loose collar D is formed with a flange F, which depends toward the axle A, being bored out so that it will just clear same, thereby giving full wearing-surface against the motor-bearing B. The face of flange F is faced off, presenting a true smooth face against the bearing B. The adjustable collar D is split at one side, as shown at G, and held in place by bolt E, passing through the bosses H H', formed on collar D. When loose collar D is adjusted to proper position the nut N is screwed up, and the bosses H H being drawn together clamp the loose collar D upon the fixed collar C, when it virtually becomes part of same for practical use. This arrangement is such that the loose collar D can be adjusted upon fixed collar C to any desired point, and when so set can be rigidly clamped in place, the loose collar D having full-face bearing against the motor-bearing B.

The construction and arrangement of the mechanism of both the fixed and loose collars are such that the end wear of motor-bearing can be quickly and conveniently taken up, and the liability to breakage and wear of motor-bearings is largely reduced by keeping the end play between bearing and collar normal at all times.

I claim as my invention—

1. The combination of an axle or shaft, a fixed collar, a loose collar thereon, and means whereby the loose collar can be adjusted, and when adjusted held in place against lateral movement, substantially as described.

2. The combination of an axle or shaft with a fixed collar having one end threaded, a loose collar threaded on said fixed collar, the loose collar being split, and a bolt and nut, by means of which the loose collar can be clamped on the fixed collar for purpose specified.

3. The combination of an axle or shaft, fixed collar, loose collar thereon, loose collar having a flange at one end, said flange depending toward axle or shaft, that a full bearing of face of loose collar may be imposed against the bearing upon axle or shaft, and means for tightening the loose collar.

In testimony whereof I have hereunto subscribed my name.

WILLIAM SEBASTIAN GRAFF BAKER.

Witnesses:
J. PAUL BAKER,
DANL. W. POWELL.